Figure 1:
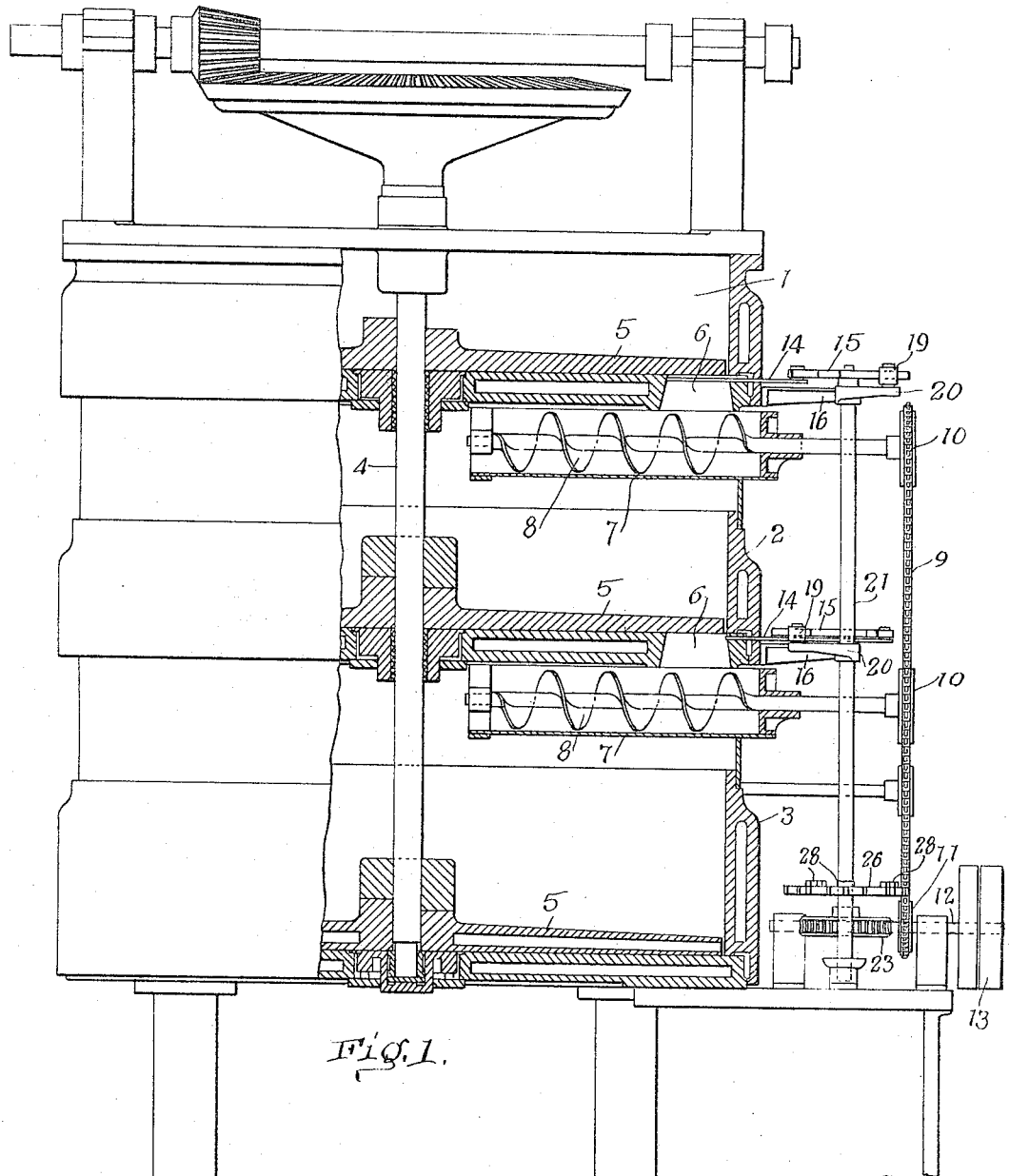

G. A. SAUER, Jr. & R. A. TRACE.
COOKER FOR SEEDS AND THE LIKE.
APPLICATION FILED JAN. 5, 1914.

1,106,586.

Patented Aug. 11, 1914.
2 SHEETS—SHEET 1.

Witnesses
Howard Walmsley
H. L. Hammaker

Inventors
George A. Sauer, Jr.
Russell A. Trace

By
Attorneys

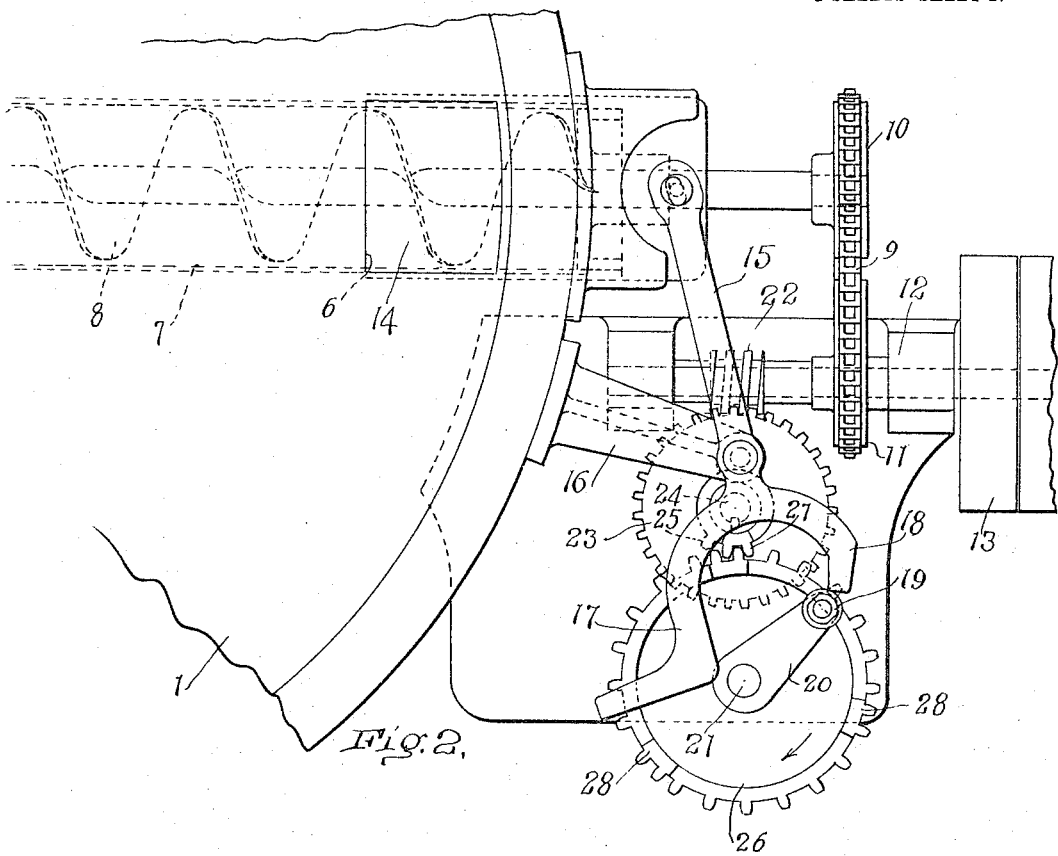
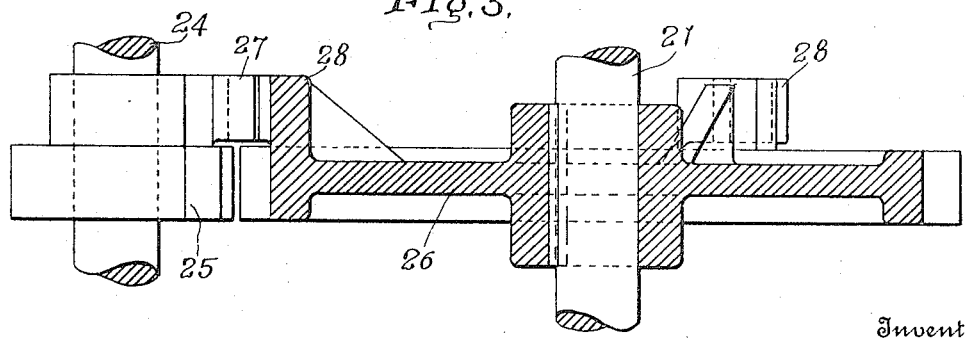

UNITED STATES PATENT OFFICE.

GEORGE A. SAUER, JR., AND RUSSELL A. TRACE, OF DAYTON, OHIO, ASSIGNORS TO BUCKEYE IRON AND BRASS WORKS, OF DAYTON, OHIO, A CORPORATION OF OHIO.

COOKER FOR SEEDS AND THE LIKE.

1,106,586.  Specification of Letters Patent.  Patented Aug. 11, 1914.

Application filed January 5, 1914. Serial No. 810,311.

*To all whom it may concern:*

Be it known that we, GEORGE A. SAUER, Jr., and RUSSELL A. TRACE, citizens of the United States, residing at Dayton, in the county of Montgomery and State of Ohio, have invented certain new and useful Improvements in Cookers for Seeds and the like, of which the following is a specification, reference being had therein to the accompanying drawing.

This invention relates to cookers for seeds and the like preparatory to extracting the oil therefrom. Cookers of this kind comprise a plurality of receptacles arranged one above the other, each receptacle being adapted to discharge into the receptacle next below it. The material in each receptacle is agitated by means of an arm or sweep which tends to spread the seeds or meal and inasmuch as this sweep is rotatively mounted at one end at the center of the receptacle its tendency is to move the seeds or meal toward the outer periphery of the receptacle. As a result it is customary to arrange the discharge opening near the outer periphery of the receptacle. However, the seeds or meal will be more evenly distributed within the receptacle and therefore more evenly acted upon by the heat therein if they are deposited in the receptacle near the center thereof, this being due again to the tendency of the sweeps to move the meal toward the outer periphery of the receptacle.

The object of the present invention is to provide means whereby the meal discharged from an upper receptacle near the outer periphery thereof may be deposited in a lower receptacle near the center thereof; and further, to provide means for automatically controlling the discharge of meal from said upper receptacle.

A further object is to provide such a mechanism which will be simple in its construction and positive in its operation.

In the accompanying drawings, Figure 1 is a side elevation, partly in section, of a cooker embodying the invention; Fig. 2 is a top plan view of a portion of such a cooker; and Fig. 3 is a detail view of the actuating gears for the cut-off.

In these drawings we have illustrated one embodiment of the invention and have shown the same as applied to a cooker of a well known type, in which the several receptacles are superposed one above the other in vertical alinement, but it will be understood that this type of cooker is chosen for the purpose of illustration only and that the invention is applicable to cookers of other kinds.

As here shown the cooker comprises three receptacles, indicated respectively by the reference numerals 1, 2 and 3. Extending centrally through the several receptacles is a shaft 4 and in each receptacle is an arm 5 secured to the shaft and rotating therewith. Each receptacle, except the bottom one, is provided with a discharge opening 6 arranged near the outer periphery thereof. The lower receptacle is also provided with a discharge opening but as this has no part in the operation of the present invention it is not here shown. The operation of the cooker is well known and it consists in depositing the seeds or meal into the upper receptacle and causing the same to be discharged at intervals through the discharge opening of this receptacle into the receptacle 2 and thence after an interval into the receptacle 3 where the cooking is completed and from which the completely cooked seeds are eventually discharged. The seeds or meal may be deposited in the upper receptacle at any convenient point but owing to the tendency of the arms or sweeps 5 to move the meal toward the outer walls of the cookers it is preferable that the discharge opening should be near such outer wall. For the reasons above given it is also desirable that the meal should be deposited near the center of the lower cooker into which it is discharged. To accomplish this we have provided a suitable device by means of which the meal may be conveyed from the discharge opening of the upper receptacle to a point near the center of the lower receptacle. This device may be of any suitable character but, in the form here shown, it comprises a trough 7 arranged beneath the discharge opening of the upper receptacle and adapted to receive the meal discharged through said opening. This trough extends inwardly to a point near the center of the lower receptacle and is provided with a discharge opening, in the present instance, the trough being open-ended. A suitable actuating device is placed within the trough to move the meal along the same toward the discharge end thereof. In the present instance this actuating device is in the form of a screw 8 journaled at its opposite ends in suitable bearings carried by the trough and having its outer end projecting beyond the side of the cooker where it is connected with suitable driving devices, such as a sprocket chain 9 extending about sprocket wheels 10 and 11 carried by the shaft of the feed screw and by a drive shaft 12, which latter is provided with a suitable driving member, such as a belt pulley 13. It will be apparent, therefore, that as the meal is discharged into the trough it will be conveyed toward the center of the lower receptacle and discharged therein, and that in this manner the sweeps or arms will act on the meal in such a manner as to provide a uniform distribution of the same within the receptacle. The meal is discharged from the receptacles only at intervals and in order that this discharge may be automatically controlled a gate 14 is provided to control each discharge opening 6. This gate is, in the present instance, a sliding gate and is connected at its outer end by means of a pin and slot connection with one end of a lever 15 pivotally supported between its ends upon a bracket 16. The opposite end of the lever 15 is bifurcated and the two portions thereof, which are shown at 17 and 18, are in the form of cams and are arranged in the path of a stud or projection 19 carried by an arm 20 secured to and rotating with a vertical shaft 21, which shaft is rotated in a manner hereinafter to be described. The arm 20 rotates in the direction of the arrow in Fig. 2 and it will be noted that the projection 19 will first engage the arm 17, thus rocking the lever 15 in a direction to open the gate 14. When the gate has been opened the projection will pass the arm 17 and the gate will remain open during the intervals required for the projection to pass from the arm 17 to the arm 18 which, when engaged by the projection, will swing the lever 15 in a direction to close the gate, the gate then remaining closed during the interval required for the projection to pass from the arm 18 to the arm 17. These movements may be timed in any suitable manner. In the present instance, the shaft 21, which carries the arm 20 and the projection 19, is rotated slowly through suitable gearing arranged near the bottom thereof. The conveyers and operating devices for the gates for the several discharge openings are the same, the only difference being that the arms 20 are so arranged on the shaft 21 as to cause the gates 14 of the respective receptacles to be opened at different times, this being a preferable arrangement, although not essential to the operation of the present invention.

The shaft 21 may be driven in any suitable manner. In the present instance the power shaft 12 has a worm 22 meshing with a worm wheel 23 on a short vertical shaft 24 arranged parallel with and alongside the lower portion of the shaft 21. Mounted on the shaft 24 is a one-toothed pinion 25 arranged to mesh with a gear 26 on the shaft 21 tending to rotate the same intermittently. In order that the gate may be quickly opened and closed means are provided for accelerating the movement of the shaft 21 at the proper times. The pinion has connected therewith and arranged above the same two extra teeth 27, in the form of a short segmental rack. The gear 26 is also provided at intervals about its periphery with superposed additional teeth, as shown at 28, in the form of short segmental racks. Consequently, when the extra or accelerating teeth on the pinion engage the extra teeth or rack on the gear the movement of the gear and, consequently, the shaft to which it is secured, will be accelerated and carried forward continuously a distance sufficient to complete the movement of the gate.

The operation of the device will be readily understood from the foregoing description and it will be apparent that the meal will be deposited near the center of each receptacle and that the gates controlling the discharge of the meal will be automatically opened and closed at predetermined intervals, thereby enabling the cooking of the meal to be properly timed and causing the meal to be evenly distributed so that the cooking of the meal will be uniform.

While we have shown and described one embodiment of the invention it will be understood that this has been chosen for the purpose of illustration only and that we do not desire to be limited to the details of construction shown and described, for obvious modifications will occur to a person skilled in the art.

Having thus fully described our invention, what we claim as new and desire to secure by Letters Patent, is:—

1. The combination, with a cooker comprising an upper receptacle and a lower receptacle arranged substantially in vertical alinement, the upper receptacle having a discharge opening through which to discharge its contents into the lower receptacle, of a device arranged to receive the meal from said discharge opening and deposit the same in the lower receptacle at a point remote from said discharge opening.

2. The combination, with a cooker comprising a plurality of receptacles arranged one above the other, each receptacle, save the lowermost, having a discharge opening through which the meal may be discharged into the receptacle next below it, of a conveyer arranged beneath each of said discharge openings to receive the meal therefrom and to convey the same to a point near the center of the next lower receptacle.

3. The combination, with a cooker comprising an upper receptacle and a lower receptacle, the upper receptacle having a discharge opening near the outer periphery thereof through which the meal may be discharged into the lower receptacle, of a trough supported beneath said discharge opening to receive the meal therefrom and extending to a point above the central portion of the lower receptacle, and an actuating member mounted in said trough to move the meal along the same and cause it to be discharged into said lower receptacle.

4. The combination, with a cooker comprising an upper receptacle and a lower receptacle, the upper receptacle having a discharge opening near the outer periphery thereof through which the meal may be discharged into the lower receptacle, of a screw-conveyer supported beneath said discharge opening to receive the meal therefrom and having its discharge opening arranged above the central portion of said lower receptacle.

5. The combination, with a cooker comprising an upper receptacle and a lower receptacle arranged substantially in vertical alinement, the upper receptacle having a discharge opening near the outer wall thereof, of a device to receive the material from said discharge opening and deposit the same near the center of said lower receptacle.

6. The combination, with a cooker comprising an upper receptacle and a lower receptacle arranged substantially in vertical alinement, the upper receptacle having a discharge opening near the outer wall thereof, of a device to receive the material from said discharge opening and deposit the same near the center of said lower receptacle, and means to automatically control the discharge of meal through said discharge opening into said device.

7. The combination, with a cooker comprising upper and lower receptacles arranged substantially in vertical alinement, the upper receptacle having a discharge opening near the outer wall thereof, of a conveyer supported beneath said discharge opening to receive the material therefrom and deposit the same near the center of the lower receptacle, a movable gate to control said discharge opening, and means to actuate said gate to open and close said opening at predetermined intervals.

8. The combination, with a cooker comprising an upper receptacle and a lower receptacle, the upper receptacle having a discharge opening, of a conveyer supported beneath said discharge opening to receive the material therefrom and discharge the same into a given part of said lower receptacle, a movable gate to control said discharge opening, means for actuating said gate to open and close the same at predetermined intervals, and means to accelerate the movement of said actuating device during the movement of said gate.

9. The combination, with a cooker comprising an upper receptacle and a lower receptacle, the upper receptacle having a discharge opening, of a conveyer supported beneath said discharge opening to receive the material therefrom and discharge the same into a given part of said lower receptacle, a movable gate to control said discharge opening, a lever connected with said gate and pivoted between its ends, a shaft, an arm carried by said shaft and having a projection adapted to engage said lever to actuate said gate, and means for rotating said shaft.

10. The combination, with a cooker comprising an upper receptacle and a lower receptacle, the upper receptacle having a discharge opening, of a conveyer supported beneath said discharge opening to receive the material therefrom and discharge the same into a given part of said lower receptacle, a movable gate to control said discharge opening, a lever pivotally mounted between its ends, having one end connected with said gate and having its other end bifurcated, the arms of the bifurcated portion of said lever having cam-shaped portions, a shaft supported adjacent to the bifurcated end of said lever, an arm carried by said shaft and having a projection arranged to successively engage the arms of the bifurcated portion of said lever during each rotation of said shaft to open and close said gate, and means for rotating said shaft.

11. The combination, with a cooker comprising an upper receptacle and a lower receptacle, the upper receptacle having a discharge opening, of a conveyer supported beneath said discharge opening to receive the material therefrom and discharge the same into a given part of said lower receptacle, a movable gate to control said discharge opening, a lever pivotally mounted between its ends, having one end connected with said gate and having its other end bifurcated, the arms of the bifurcated portion of said lever having cam-shaped portions, a shaft supported adjacent to the bifurcated end of said lever, an arm carried by said shaft and having a projection arranged to successively engage the arms of the bifurcated portion of said lever during each rotation of said shaft to open and close said gate, means for rotating said shaft, and means for accelerating the movement of said shaft while said projection is in engagement with the cam-shaped portions of said arms.

12. The combination, with a cooker comprising an upper receptacle and a lower receptacle, the upper receptacle having a discharge opening, of a conveyer supported beneath said discharge opening to receive the material therefrom and discharge the same into a given part of said lower receptacle, a movable gate to control said discharge opening, a lever connected with said gate and pivoted between its ends, a shaft, an arm carried by said shaft and having a projection adapted to engage said lever to actuate said gate, a gear secured to said shaft, a segmental rack secured to said gear, a one-toothed pinion meshing with said gear, and a segmental rack carried by said pinion having its teeth arranged to engage the teeth of the first-mentioned segmental rack, and means for actuating said pinion.

13. The combination, with a cooker comprising an upper receptacle and a lower receptacle, said upper receptacle having a discharge opening near its outer edge through which the meal may be discharged into the lower receptacle, and centrally mounted sweeps rotating in said receptacles, of a conveyer arranged to receive the meal from said discharge opening and to deposit the same at a point where it will be engaged by the inner portion of the sweep of the lower receptacle.

14. The combination, with a cooker comprising an upper receptacle and a lower receptacle, said upper receptacle having a discharge opening near its outer edge through which the meal may be discharged into the lower receptacle, and centrally mounted sweeps rotating in said receptacles, of a radially arranged conveyer supported beneath said upper receptacle and communicating with said discharge opening and having its discharge end arranged to discharge material near the inner end of the sweep in said lower receptacle.

15. The combination, with a cooker comprising an upper receptacle and a lower receptacle, the upper receptacle having a discharge opening through which the material therein may be discharged into the lower receptacle, of a movable gate to control said discharge opening, means for actuating said gate to open and close the same at predetermined intervals, and means to accelerate the movement of said actuating device during the movement of said gate.

16. The combination, with a cooker comprising an upper receptacle and a lower receptacle, the upper receptacle having a discharge opening through which the material therein may be discharged into the lower receptacle, of a movable gate to control said discharge opening, a shaft operatively connected with said gate, a gear secured to said shaft, a segmental rack secured to said gear, a one toothed pinion meshing with said rack, and a segmental rack carried by said pinion and having its tooth arranged to engage the teeth of the first-mentioned segmental rack, and means for actuating said pinion.

17. The combination, with a cooker comprising upper and lower receptacles, and revolving sweeps mounted in both of said receptacles, of means for taking the material from the upper receptacle at a point near the outer end of the sweep therein and depositing the same in the lower receptacle near the inner end of the sweep in said lower receptacle.

In testimony whereof, we affix our signatures in presence of two witnesses.

GEORGE A. SAUER, Jr.
RUSSELL A. TRACE.

Witnesses:
JACOB H. ECKERT,
EDWARD A. WENZ.